UNITED STATES PATENT OFFICE.

WILLIAM T. HEADLEY, OF PHILADELPHIA, PENNSYLVANIA, ASSIGNOR TO HEADLEY GOOD ROADS COMPANY, OF WILMINGTON, DELAWARE, A CORPORATION OF DELAWARE.

COMPOSITION FOR CONSTRUCTING ROADS OR PAVEMENTS.

1,045,286.      Specification of Letters Patent.      Patented Nov. 26, 1912.

No Drawing.      Application filed October 22, 1910. Serial No. 588,525.

*To all whom it may concern:*

Be it known that I, WILLIAM T. HEADLEY, a citizen of the United States, residing at the city of Philadelphia, in the county of Philadelphia and State of Pennsylvania, have invented certain new and useful Improvements in a Composition for Constructing Roads or Pavements, of which the following is a specification.

The principal object of my present invention, is to provide an efficient composition for use in the constructing of a road or pavement, which practically is dustless and having the peculiar qualities of asphaltum or bituminous bonded macadam roads, the strength of concrete, and inexpensive and convenient to construct; and further a pavement or road practically most satisfactory as to wearing qualities owing to its solidity or stability and dustless conditions under variable influences of use.

To which ends, my invention consists first of an asphaltic cement for use in the constructing of a pavement or road embracing with intermingled aggregated mineral materials, Portland cement and sand or fine stone and the said cement and water employed in a cold state or condition and under pressure the mass formed into a solid or stable smooth surfaced road or pavement.

In carrying my invention into effect, the following method will give excellent results:—Four parts of crushed stone or other mineral aggregate that will pass through meshes ranging from 1/2" to 2" or other convenient sizes. The stone or other intermingled mineral materials are subjected to a bath or sprinkling with a solution composed 2/3 of bicomac, an asphalt cement prepared as hereinafter stated, and 1/3 water and thoroughly mixed either by hand or machinery, until the particles of mineral matter are coated with said cement. After the stone or mineral matter has undergone the said treatment, one part of slow setting Portland cement and two parts of sand, mixed together dry, are added to the stone or mineral aggregate, that has been previously coated with the diluted cement, in order that the sand and cement may adhere to the aggregate mineral mass, and if required, additions of the cement diluted to a greater extent may be added to thin down the conglomerated mass until presenting a condition most nearly corresponding to ordinary cement concrete, as commonly used. When the conglomerate mass has been prepared as explained, it is placed upon a suitable foundation, in desired thickness, and rolled then to set so as to become thoroughly consolidated. This is readily ascertained by any excess fluid rising to the surface of the formed structure together with any excess sand and cement failing to cling or lodge to become a part of the aggregated setting mass and fill voids therebetween, will also rise to the surface, whereby under rolling action a perfectly rigid, solid and smooth top surface will be given to the finished pavement or road.

A pavement or road prepared in the manner explained and constructed as described, must be protected against travel for a few hours, in order that travel thereafter will not rut it or water be absorbed thereby. After rolling has been completed and the fluid rising to the top has drained off, a slight coating of sand or screenings may be thrown over the surface to protect the same until the mass has become thoroughly set or the road rigid.

The important elementary feature of my invention is the use of the asphaltic cement used in conjunction with the aggregated mineral materials, water, Portland or other cement, and sand or fine stone screenings, in the formation of the above defined road or pavement. This asphaltic cement, consists of asphalt, liquid or solid, natural or artificial, crude or refined, fluxed when necessary, with an asphaltic oil. The composition is mixed hot to produce an emulsified asphaltic product of the proper character, and consistency for use. A good working formula has been found to be to take 80% of the composition of asphalt and asphaltic oil, and mix or combine with the same 20% of cottonseed oil, caustic potash and water. These ingredients assisting in saponification and disintegration and also in hastening the softening of the principal elements of the emulsifying composition; and further expediting the bringing of the resultant emulsified product when ready for use with water, into a highly desirable workable condition, with aggregated mineral materials, cement and sand alone or with fine stone or screenings. One of the chief advantages of constructing a pavement or road in such manner is that the amalgamated mass is workable in substantially the same manner as ordinary Portland cement concrete is workable practically, in the applied arts. Then by the use of the amalgamated mass, in a cold state, the pavement or road can be very expeditiously and inexpensively constructed and finished, because a roller is the only necessary piece of machinery required to be employed to practically complete such a road structure without regard to what the reason is or what may be the weather conditions. The amalgamated mass so treated is applied to the foundation in such a manner as that it sets up and fills voids with solid materials making throughout a decidedly rigid, stable or solid pavement or road with highly desirable smooth surface conditions. One of the principal points of advantage of my said invention, is that the asphaltic cement can be supplied cold and when mixed with the necessary sand, stone and cement, also in a cold state, necessary repairs thereby can be expeditiously and economically effected.

Having thus described the nature and objects of my invention, what I claim as new and desire to secure by Letters Patent is:—

1. An improved wearing surface product for roads or pavements, composed of an emulsified cement about two parts, water about one part, slow setting Portland cement about one part and dry sand or fine stone screenings about two parts, all combined together and adapted to be applied to and over a mineral aggregate to coat and impregnate the same, substantially as and for the purposes described.

2. An improved wearing surface product, which consists of an emulsified asphaltic cement about two parts, water about one part, slow setting Portland cement about one part and dry sand or fine stone screenings about two parts, all combined together, and said product adapted to be mixed with a mineral aggregate to coat and impregnate the same and the said coated and impregnated mineral aggregate adapted to be applied to a foundation, whereby under compression is derived a smooth, compact and stable wearing surface of a road or pavement, substantially as described.

In witness whereof, I have hereunto set my signature in the presence of two subscribing witnesses.

WILLIAM T. HEADLEY.

Witnesses:
J. WALTER DOUGLASS,
THOMAS M. SMITH.

Copies of this patent may be obtained for five cents each, by addressing the "Commissioner of Patents, Washington, D. C."